2,774,673
Patented Dec. 18, 1956

2,774,673
FOOD ADDITIVE

Robert H. Young, Wooster, Ohio

No Drawing. Application June 2, 1954,
Serial No. 434,090

5 Claims. (Cl. 99—143)

My invention relates to a food additive having long shelf life and containing correct amounts of active proteolytic enzymes from vegetable sources and a source of glutamic acid. More particularly, my invention relates to a combination of the above-mentioned two important ingredients in the proportions capable of providing the highest tenderizing and flavoring characteristics, the sensitivity of the proteolytic enzyme being uniquely protected from rapid loss of potency by chemical compounds added to the mixture in predetermined optium quantities.

As is well known only a very small amount of the powerful proteolytic enzyme system which exists in papain is needed to accomplish the desired tenderizing effect on foods and especially meat. A vehicle such as salt is a satisfactory vehicle for facilitating even distribution of the proteolytic enzyme and other natural enzymes in papain. Many attempts have been made to protect the highly sensitive enzymes of papain to enable the packaging and distribution of a food additive of long life. To inhibit loss of potency of the enzymes, various mixtures have been resored to with no great success, this being due in part to the distasteful protective ingredients in the mixtures which were added to inhibit loss of potency of the enzymes.

The unexpected results of my extensive research in this field are accomplished by adding to predetermined precise quantities of papain and monosodium glutamate, protective chemical compounds intended only for protecting the proteolytic enzyme from decomposing or becoming inactivated. It is definitely known that enzymes not in the oxidation class gradually deteriorate on standing. I have found that by the addition of purified maize carbohydrates, such as dextrose, dextrin and corn starch, one phase of the enzyme is protected. It is generally known also that many of the condiments are anti-oxidants. Oxidation reactions are those responsible for the destroying of non-oxidizing enzymes. The condiments most effective as anti-oxidants are black pepper and paprika. These are added in sufficient quantities to inhibit any oxidizing effect that might take place in the storage life of this new mixture. The addition of purified maize carbohydrate compounds plus these two condiments in no way affects the monosodium glutamate, or the enzyme action of the proteolytic enzyme.

It has been found that the proteolytic enzyme, protected as carefully as I have done in my mixture, can be used in rather small percentages on all types of meat products for tenderizing. In these percentages, tenderizing is regulated so that the final product is delicious for eating. The monosodium glutamate compound is added in precisely correct amounts to bring out the natural flavor of the meat or vegetable products. This flavor of most food products is governed by the correct amount of glutamic acid. The monosodium glutamate in this mixture contains the right amount of monosodium glutamate so that when it separates into glutamic acid the desired quality appears.

It has been found through extensive experiments that the proteolytic enzyme is in no way protected by or affected by the addition of the monosodium glutamate. One has no effect on the other. Both are used for the double purpose of first, tenderizing, and second, bringing out the natural flavor of foods. This laboratory discovery is, of course, not in complete accord with the patent of 1938 to Allen, No. 2,140,781.

The monosodium gluamate reacts best at pH 5 to pH 7. To give it a somewhat longer pH range, magnesium oxide and sodium silicate, a common additive of common salt, are used in this mixture. Ordinarily meats and most vegetables would not have a reaction of lower than pH 5. However, this mixture can be used on more acid foods.

This novel mixture contains in addition to proteolytic enzymes, monosodium glutamate, carbohydrates, and condiments, salt (sodium chloride) as a filler and seasoning agent to effect a dilution of the proteolytic enzyme and monosodium glutamate so that the mixture can be evenly applied to the food. The mixture contains all ingredients in precisely predetermined proportions proved through extensive and exhaustive experimentation to be most desirable for mild flavoring and seasoning of food products coupled with long shelf life of the product.

My uniquely novel mixture, therefore, is a food additive that tenderizes meats in a regulated measure and preserves or enhances the natural flavor. My novel mixture is a convenient and commercially feasible product for obtaining these two very desirable results.

This novel mixture containing the ingredients as listed—proteolytic enzymes, monosodium glutamate, purified maize carbohydrates (dextrose, dextrin, and corn starch), pepper, and paprika—has been found to remain free flowing, has a 12-month shelf life or longer, and is readily sifted on the meat or other foods before cooking, or just before eating.

The preferred ranges of ingredients by weight determined by experimentation resulting in my invention are as follows:

(1) Papain, 1½ to 3 percent
(2) Monosodium glutamate, 7½ to 12 percent
(3) Salt (NaCl), the remainder
(4) Black pepper, 1 to 2 percent
(5) Dextrin, 4 to 6½ percent
(6) Dextrose, 1 to 5 percent
(7) Paprika, 3 to 6 percent
(8) Corn starch, 1 to 2 percent In the above mixture the papain is the dried latex of the green papaya fruit. The purified maize carbohydrates, namely, dextrose, dextrin, and corn starch, protect the enzyme products from deteriorating and are believed to prevent any possible chemical reactions with the salt (NaCl) and the monosodium glutamate. Under test the mixture has remained stable and has a shelf life of substantial potency of more than 12 months.

It will be noted from the above preferred ranges of ingredients that the purified maize carbohydrates, namely, dextrin, dextrose and corn starch, when added together fall within the range of 6 to 13½% by weight. Similarly, the condiments, namely, black pepper and paprika, when added together fall within the range of 4 to 8% by weight.

The most satisfactory mixture of the ingredients has been found to be as follows (the percentages being by weight):

(1) Papain, 2 percent
(2) Monosodium glutamate, 10 percent
(3) Salt (NaCl), 75 percent
(4) Black pepper, 1 percent
(5) Dextrin, 5 percent
(6) Dextrose, 3 percent
(7) Paprika, 3 percent
(8) Corn starch, 1 percent In use the tenderizing and seasoning properties of this specific preferred mixture have been far beyond expectations and its shelf life has been well in accord with commercial requirements, it having a life of substantial potency for more than 12 months.

I claim:

1. A food additive for accenting the natural flavor of and for tenderizing foods comprising a proteolytic enzyme from vegetable sources within the range of 1½ to 3% by weight, monosodium glutamate within the range of 7½ to 12% by weight, purified maize carbohydrates within the range of 6 to 13½% by weight, anti-oxidant condiments within the range of 4 to 8% by weight, and salt the remainder.

2. A food additive for accenting the natural flavor of and for tenderizing foods comprising a proteolytically potent papain within the range of 1½ to 3% by weight, monosodium glutamate within the range of 7½ to 12% by weight, purified maize carbohydrates within the range of 6 to 13½% by weight, anti-oxidant condiments within the range of 4 to 8% by weight, and salt the remainder.

3. A food additive for accenting the natural flavor of and for tenderizing foods comprising a free flowing, dry, powdered mixture including a proteolytically potent papain within the range of 1½ to 3% by weight, monosodium glutamate within the range of 7½ to 12% by weight, purified maize carbohydrates within the range of 6 to 13½% by weight and selected from the group consisting of dextrin, dextrose and corn starch, anti-oxidant condiments within the range of 4 to 8% by weight and selected from the group consisting of black pepper and paprika, and salt the remainder.

4. A food additive for accenting the natural flavor of and for tenderizing foods comprising a free flowing, dry, powdered mixture having long-lived potency including proteolytically potent papain within the range of 1½ to 3% by weight; monosodium glutamate within the range of 7½ to 12% by weight; protective chemical compounds for inhibiting the decomposing and inactivation of the proteolytically potent papain including dextrose within the range of 1 to 5% by weight, dextrin within the range of 4 to 6½% by weight, corn starch within the range of 1 to 2% by weight, black pepper within the range of 1 to 2% by weight and paprika within the range of 3 to 6% by weight; and salt the remainder as a filler and seasoning agent to effect a dilution of the papain and monosodium glutamate to facilitate even application thereof.

5. A food additive for accenting the natural flavor of and for tenderizing foods comprising a free flowing, dry, powdered mixture including a proteolytically potent papain in an amount 2% by weight; monosodium glutamate in an amount 10% by weight; protective chemical compounds for inhibiting the decomposing and inactivation of the proteolytically potent papain including dextrose in an amount 3% by weight, dextrin in an amount 5% by weight, corn starch in an amount 1% by weight, black pepper in an amount 1% by weight, and paprika in an amount 3% by weight; and salt in an amount 75% by weight as a filler and seasoning agent to effect a dilution of the papain and monosodium glutamate to facilitate even application thereof.

References Cited in the file of this patent

UNITED STATES PATENTS

| | | |
|---|---|---|
| 2,021,403 | Brust | Nov. 19, 1935 |
| 2,173,992 | Allen | Sept. 26, 1939 |
| 2,464,200 | Hall | Mar. 15, 1949 |
| 2,634,212 | Komarik | Apr. 7, 1953 |